Patented May 16, 1939

2,158,213

UNITED STATES PATENT OFFICE 2,158,213

PROCESS OF PREPARING CHLORINATED ETHYLENES

Georg Basel and Erich Schaeffer, Burghausen, Upper Bavaria, Germany, assignors to Dr. Alexander Wacker Gesellschaft für Elektrochemische Industrie G. m. b. H., Munich, Bavaria, Germany, a corporation of Germany No Drawing. Application June 7, 1937, Serial No. 146,874. In Germany June 16, 1936

3 Claims. (Cl. 260—654)

This invention relates to the simultaneous production of monochlorethylene and polychlorethylenes and has for its object to provide an improved economical process for this purpose.

In carrying out our improved process a gaseous mixture of acetylene and chlorinated ethane with more than 3 atoms of chlorine is passed over catalysts at elevated temperatures. The process is suitably performed at 200–300° C. and utilizes porous bodies of high surface action, such as activated carbon as catalysts. Chlorine containing compounds, such as barium chloride, bismuth chloride, etc., may be advantageously incorporated with the catalyst. The acetylene, which is used advantageously in excess quantities, may be again added to the reaction mixture, so far as it was not used in the reaction.

Example 1

A gaseous mixture of 378 g. tetrachlorethane and 60–80 g. acetylene is caused to pass, in an hour's time, through a space of 2000 cubic cm. heated to 250° C., which is filled with 750 g. activated carbon. A mixture of unconverted tetrachlorethane, trichlorethylene, vinyl chloride, acetylene and hydrochloric acid emerges from the reaction space, and a mixture of trichlorethylene and tetrachlorethane can be separated from this gas by cooling. The hydrochloric acid may be removed by water and the vinyl chloride (monochlorethylene) recovered by cooling to a low temperature or by means of suitable non-volatile absorption means. The quantity of vinyl chloride recovered in an hour amounts to 8 g. and of trichlorethylene 271 g.

Example 2

The conditions correspond to those of Example 1, but the activated carbon is saturated with barium chloride to the extent of about 50% of its weight. The quantity recovered in an hour amounts to 28.6 g. vinyl chloride and 179 g. trichlorethylene.

Example 3

The process is performed as in Example 1, but the activated carbon is saturated with 15% bismuth chloride. In an hourly supply of 430 g. of tetrachlorethane and 80 g. of acetylene, there is formed 87 g. vinyl chloride, which corresponds to a transformation of 53.5%.

Example 4

In a saturation of activated carbon with 20% iron chloride, there is a conversion to vinyl chloride of 12%, the process being performed as in Example 1.

Example 5

In using cadmium chloride as a catalyst, there is a conversion to vinyl chloride of 11%. In a similar manner, we may use charcoal or animal charcoal saturated with metal salts.

Example 6

In a saturation of activated carbon with 17% mercuric chloride, there is obtained a vinyl chloride conversion of 27%.

Example 7

In a saturation of activated carbon with 15% zinc chloride, there is a conversion to vinyl chloride of 8%.

Example 8

Through a catalyst space, which was charged with activated carbon corresponding to Example 2, there were passed in one hour at a temperature of about 260° C., 400 g. pentachlorethane and 70 g. of acetylene. The mixture withdrawn from the reaction space consisted of unconverted pentachlorethane, further tetrachlorethylene, vinyl chloride, hydrochloric acid and acetylene, which was worked up in the manner described in Example 1. The quantity of recovered vinyl chloride in an hour was 12.5 g. and of tetrachlorethylene 322 g. In the same way, pentachlorethane may also be converted to tetrachlorethylene and vinyl chloride with activated carbon alone, or with carbon which is saturated with other types of metal salts.

The invention claimed is:

1. Process of preparing chlorinated ethylenes which comprises passing a gaseous mixture of acetylene and pentachlorethane over a catalyst substance of high surface action at a temperature of 200–300° C.

2. Process of preparing chlorinated ethylenes which comprises passing a gaseous mixture of acetylene and pentachlorethane over activated carbon at a temperature of 200–300° C.

3. Process of preparing chlorinated ethylenes which comprises passing a gaseous mixture of acetylene and pentachlorethane over activated carbon containing a metal chloride, at a temperature of 200–300° C.

GEORG BASEL.
ERICH SCHAEFFER.